United States Patent [19]

Mizukami et al.

[11] Patent Number: 5,962,349
[45] Date of Patent: Oct. 5, 1999

[54] DOUBLE-KNITTED FABRIC AND MOLDINGS AND MOUSE PADS MADE THEREOF

[75] Inventors: Yoshikatsu Mizukami; Toshihide Tomikawa, both of Osaka, Japan

[73] Assignee: Kanebo, Ltd., Tokyo, Japan

[21] Appl. No.: 08/952,651

[22] PCT Filed: Mar. 28, 1996

[86] PCT No.: PCT/JP96/00873

§ 371 Date: Nov. 24, 1997

§ 102(e) Date: Nov. 24, 1997

[87] PCT Pub. No.: WO96/37648

PCT Pub. Date: Nov. 28, 1996

[30] Foreign Application Priority Data

May 23, 1995 [JP] Japan .................................... 7-149589
Aug. 25, 1995 [JP] Japan .................................... 7-240590
Sep. 5, 1995 [JP] Japan .................................... 7-254583

[51] Int. Cl.$^6$ ....................................................... D04B 7/04

[52] U.S. Cl. ........................... 442/311; 442/101; 442/312; 442/319; 66/196; 66/202

[58] Field of Search ...................................... 442/311, 101, 442/312, 319; 66/192, 202

[56] References Cited

FOREIGN PATENT DOCUMENTS

| | | |
|---|---|---|
| 1-250454 | 10/1989 | Japan . |
| 1-266246 | 10/1989 | Japan . |
| 5-331748 | 12/1993 | Japan . |
| 6-180626 | 6/1994 | Japan . |

*Primary Examiner*—Christopher Raimund
*Attorney, Agent, or Firm*—Armstrong, Westerman, Hattori, McLeland & Naughton

[57] ABSTRACT

A double-knitted fabric comprising a face cloth and a back cloth which are joined together by a tie yarn, wherein the tie yarn contains not less than 20% by weight of a heat-bonding yarn and the back cloth contains not less than 20% by weight of a heat-bonding yarn, a molded article made thereof and a mouse pad made thereof.

14 Claims, No Drawings

DOUBLE-KNITTED FABRIC AND MOLDINGS AND MOUSE PADS MADE THEREOF

TECHNICAL FIELD

The present invention relates to double-knitted fabrics and moldings and mouse pads made thereof. More particularly, the present invention relates to double-knitted fabrics which are suitably used in heat insulators such as clothing, outfits for protection against cold, curtains and blinds; interior materials for automobiles, ships, airplanes or the like such as under-carpets, carpets, tablecloths, coasters, seat-mats, door materials, seat materials and ceiling materials; cushioning materials for use as linings for helmets, mouse pads, rubberized tapes for cables and medical tapes; and moldings such as brassiere cups, hats, protectors, interlinings, guesses, cases, shoes, bags, gloves, saddles for bicycles and bedspreads, and the present invention also relates to moldings made of the double-knitted fabrics and to mouse pads used when operating a mouse in connection with computers or the like.

BACKGROUND ART

Double-knitted fabrics have been conventionally used in various fields. A tie yarn most popularly used for connecting a face cloth and a back cloth in such double-knitted fabrics is a usual finished yarn. These double-knitted fabrics are mainly used as back cloth in clothing and provide cushioning and heat insulating properties.

Double-knitted fabrics utilizing a heat-bonding fiber as the tie yarn are known, for instance, as knit fabric moldings such as bra cups as disclosed, for instance, in Japanese Patent Publication Kokai No. 4-240252. This is a molding utilizing the stretchability of knit fabric and the moldability of heat-bonding fiber.

In general, when such moldings are used as sewing articles such as seats for automobiles, they are required to have a great seam strength. However, the afore-mentioned molding of a knit fabric which is not particularly made for this purpose cannot hold a satisfactory seam strength. Thus, it is hard to apply such a knit fabric molding to a sewing article such as seats for automobiles or the like.

On the other hand, a three-layer structured knit fabric of two-way tricot is already put on the market, which is an article similar to the afore-mentioned knit fabric molding. In such a three-layer structured knit fabric, a monofilament is employed as the tie yarn in order to improve the cushioning property by a large elastic modulus, and a spandex is used in order to provide a stretchability in vertical and longitudinal directions despite being a tricot fabric. Consequently, such a three-layer structured knit fabric has the disadvantage of being expensive.

Unlike tricots, double-knitted fabrics which are ordinarily produced by using a circular knitting machine are provided with a stretchability in vertical and longitudinal directions through their knitting fabric without using spandex. However, a circular knitting machine cannot knit monofilaments having a large elastic modulus as used in two-way tricots.

Therefore, when producing double-knitted fabric, a heat-bonding yarn has been used as the tie yarn which is soft at the time of knitting and which presents a large elastic modulus after knitting. Double-knitted fabrics which are made by using a heat-bonding yarn as the tie yarn are known to be obtained by fusing the tie yarn through heat treatment after knitting to obtain a large elastic modulus.

However, for portions of articles at which a high cushioning property is required such as inner linings for shoes, tricots are still used at present. The reason why no double-knitted fabric has been used in such fields is that fatigue against repetitive load is large. Thus, if double-knitted fabrics which assume smaller fatigue against repetitive load can be easily manufactured, the uses thereof would be widen, since the manufacturing cost thereof is lower than that of tricots.

At present, various mouse pads for use with computers are sold, and most of them are those formed by laminating a polyurethane sponge onto a knit surface material. In such mouse pads, the surface material improves the gliding of the mouse, and the rolling of the ball is improved by providing the cushioning property. The urethane sponge also functions as a non-slip material between the mouse pad and a table. However, since the deformation amount against load largely differs between the surface material and the urethane sponge such mouse pads have the drawback that the surface material and the urethane sponge are easy to peel off when used over a long term.

In view of this drawback, three-layer structured knit fabrics such as double tricots are attracting attention as materials for mouse pads. The cushioning property of such a double tricot fabric can be varied by selecting a proper texture required for the mouse pads.

However, the knits such as double tricots do not present sufficient non-slip properties between the mouse pad and the table so that they cannot be used for mouse pads without any treatments. Further, they have the disadvantage that the cut portions thereof are easy to fray and accordingly has to be treated for runproofing.

The present invention has been made in view of the above-mentioned prior art, and it is an object of the present invention to provide a double-knitted fabric with an excellent moldability, a high seam strength and an excellent cushioning property, which is inexpensive and can be suitably used in various heat insulators, cushioning materials and moldings, and to provide moldings made thereof, and mouse pads which sensitively accommodate even to slight movements of a mouse used in connection with computers or the like.

DISCLOSURE OF THE INVENTION

The present invention relates to (1) a double-knitted fabric comprising a face cloth and a back cloth which are joined together by a tie yarn, wherein said tie yarn contains not less than 20% by weight of a heat-bonding yarn and said back cloth contains not less than 20% by weight of a heat-bonding yarn, (2) a molding obtained by molding said double-knitted fabric, (3) a mouse pad comprising a double-knitted fabric comprising a face cloth and a back cloth which are joined together by a tie yarn, wherein said tie yarn contains not less than 20% by weight of a heat-bonding yarn, said face cloth contains not less than 20% by weight of a heat-bonding yarn, and said back cloth is subjected to a non-slip processing, and wherein said face cloth and said back cloth are heat-bonded at their end portions, and (4) a mouse pad comprising a three-layer structured double tricot comprising a face cloth and a back cloth which are joined together by a tie yarn, wherein said face cloth contains not less than 20% by weight of a heat-bonding yarn, said back cloth is subjected to a non-slip processing, and said face cloth and back cloth are heat-bonded at their end portions.

BEST MODE FOR CARRYING OUT THE INVENTION

The double-knitted fabric according to the present invention comprises a face cloth and a back cloth which are joined together by a tie yarn, wherein the tie yarn contains not less than 20% by weight of a heat-bonding yarn and the back cloth contains not less than 20% by weight of a heat-bonding yarn.

One of the features of the double-knitted fabric of the present invention is that the specific tie yarn and a back cloth containing the specific yarn are used.

The present inventors have repeatedly made a study about tie yarn and back cloth for double-knitted fabric and conditions for the heat treatment thereof, and have found that the yarn used in the back cloth greatly affects the moldability and seam strength of the double-knitted fabric, and that the yarn used as the tie yarn affects the cushioning property of the double-knitted fabric. By further continuing studies, the inventors have found that when manufacturing double-knitted fabrics by using the specific tie yarn mentioned above and the back cloth containing the specific yarn mentioned above, the obtained double-knitted fabrics have properties such as superior moldability, high seam strength and superior cushioning property. Further, since the materials used for the manufacturing are inexpensive, the double-knitted fabric can be manufactured at low cost.

The term "double-knitted fabric" as used herein indicates a three-layer structured purl circular knitted fabric.

Types of the yarn used for the face cloth of the double-knitted fabric according to the present invention are not particularly limited. It is desirable to suitably select the yarns according to the usage of the product.

Examples of the yarn used in the face cloth are, for instance, filaments of synthetic fibers such as polyester, nylon, polypropylene and polyethylene, and spun yarns, blended yarns, twisted union yarns, and combined filament yarns of natural fibers such as sheep wool, cotton and hemp.

The face cloth may be of first-dyed yarn, and may contain a jacquard knitted design.

The face cloth may contain, if required, a heat-bonding yarn as used in the back cloth or tie yarn mentioned later.

The thickness of the yarn constituting the face cloth is not particularly limited, and may be suitably selected according to the knitting fabric or knitting machine.

Further, when the product is to be used, for instance, for seats of automobiles, the face cloth is preferably raised so that stains formed thereon are hard to stand out. In case of raising the face cloth, the face cloth is preferably composed of a combined filament yarn of different shrinkage rates or a bulked yarn. Especially a bulked yarn is preferable since it is a spun yarn and can be easily raised. When raising the face cloth, various yarns may be twist-blended so that the raising may be uneven.

The thickness of the face cloth is not particularly limited and may be suitably adjusted in view of the usage of the obtained double-knitted fabric, or the like.

The back cloth of the double-knitted fabric of the present invention contains not less than 20% by weight of heat-bonding yarn.

Representative examples of the heat-bonding yarns used in the back cloth are, for instance, a core-sheath type heat-bonding yarn composed of a core-sheath conjugate fiber wherein, for instance, the core has a high melting point and the sheath has a low melting point, a side-by-side type heat-bonding yarn and a heat-bonding yarn obtained by fiber combining, twisting, yarn doubling or mix spinning of a synthetic fiber of a low melting point with a synthetic fiber of a high melting point or a natural fiber. Concrete examples of such heat-bonding yarns are, for instance, a core-sheath type heat-bonding yarn such as Bellcouple (registered trademark, manufactured by Kanebo, Ltd., type LHC, filament, core: polyester, sheath: copolyester of low melting point), Bellcouple (registered trademark, manufactured by Kanebo, Ltd., type HCC, filament, core: polyester, sheath: nylon), or Bellcouple (registered trademark, manufactured by Kanebo, Ltd., type LCO, core: polyester, sheath: copolyester of low melting point); a core-sheath type heat-bonding yarn for core-sheath type blended yarn such as Bellcombi (registered trademark, manufactured by Kanebo, Ltd., staple, core: polyester, sheath: polyester or polyethylene of low melting point); a staple heat-bonding yarn such as type PP-HB (manufactured by Chisso Corp., propylene homopolymer, staple), type BF (manufactured by Daiwabo Co., Ltd., ethylene homopolymer, staple), or type 410 (manufactured by Eastman, copolyester, staple); and a side-by-side type heat-bonding yarn such as type ES (manufactured by Chisso Corp., one side: polypropylene, the other side: polyethylene). These yarns may be used alone or in admixture thereof.

The above-mentioned heat-bonding yarns all have a melting point of approximately 110–220° C.

As mentioned before, the back cloth of the double-knitted fabric according to the present invention contains not less than 20% by weight of a heat-bonding yarn. If the content of the heat-bonding yarn is less than 20% by weight, the seam strength of the obtained double-knitted fabric is small and the shape-retainability after molding also decreases. Thus, the quality of end products obtained from such double-knitted fabrics, such as seats for automobiles or bra cups, is deteriorated. In order to further improve the seam strength and moldability of the double-knitted fabric, it is preferable that the content of the heat-bonding yarn is from 30 to 100% by weight, especially 50 to 100% by weight.

The back cloth is not particularly limited so long as it contains not less than 20% by weight of the heat-bonding yarn. The back cloth may be composed of a heat-bonding yarn alone, but in addition thereto, yarns of various kinds of synthetic or natural fibers as previously listed for use in the face cloth may be suitably used.

The back cloth may be those obtained by twisting various yarns. Especially a back cloth obtained by union knitting of a false twist finished yarn having a high stretchability such as polyester or nylon is preferable from the viewpoint of high stretchability. Further, a back cloth of a bulked yarn having a high stretchability is also preferable from the viewpoint of high stretchability.

The back cloth may be of first-dyed yarn or may contain a jacquard knitted design.

The thickness of the yarn constituting the back cloth is not particularly limited, and may be suitably selected according to the knitting fabric or knitting machine.

The thickness of the back cloth is not particularly limited and may be suitably adjusted in view of the usage of the obtained double-knitted fabric, or the like.

The tie yarn of the double-knitted fabric according to the present invention contains not less than 20% by weight of a heat-bonding yarn.

The heat-bonding yarn used as the tie yarn can be, for instance, selected from the yarns exemplified as the heat-bonding yarns for the back cloth.

From the viewpoint of improvement in the durability of welded portions against repetitive loading, core-sheath type heat-bonding yarns are preferably used as the tie yarn. Among these, core-sheath type heat-bonding yarns wherein an elastomer such as a block copolymer of polybutylene terephthalate and polytetramethylene glycol or a thermoplastic polyurethane is used as the sheath are preferred, since they present a superior resistance against repetitive loading to the tie yarn. Further, although these elastomers usually have a low Young's modulus, in the double-knitted fabric of the present invention it is more preferable that the polymer used in the sheath of the core-sheath type heat-bonding yarn has a Young's modulus of not more than 600 kg/mm$^2$, preferably not more than 300 kg/mm$^2$, since the tie yarn is superior in resistance against repetitive loading. Such polymers having a Young's modulus of not more than 600 kg/mm$^2$ are, for instance, such as nylons, polypropylenes such as syndiotactic polypropylene, and copolymers of propylene and other copolymerizable monomers such as ethylene. The Young's modulus of the polymers is preferably not less than 50 kg/mm$^2$ from the viewpoint of providing a proper sturdiness.

As mentioned before, the tie yarn used in the double-knitted fabric according to the present invention contains not less than 20% by weight of a heat-bonding yarn. If the content of the heat-bonding yarn is less than 20% by weight, the cushioning property of the double-knitted fabric is inferior. In order to further improve the cushioning property of the double-knitted fabric, it is desirable that the content of the heat-bonding yarn is from 30 to 100% by weight, preferably 50 to 100% by weight.

In the present invention, it is preferable to select the heat-bonding yarn used for the back cloth and the heat-bonding yarn used as the tie yarn respectively so that the melting point of the heat-bonding yarn for the back cloth is lower than that of the heat-bonding yarn used as the tie yarn by at least 20° C., especially at least 30° C., since the thickness of the double-knitted fabric does not remarkably vary at the time of molding and the bulkiness is hardly decreased.

As the above-mentioned tie yarn, there are used yarns containing not less than 20% by weight of a heat-bonding yarn. The tie yarn may be composed of a heat-bonding yarn alone. Alternatively, the tie yarn may be those obtained by twisting the heat-bonding yarn as mentioned above with a filament such as a false twist finished yarn or a blended yarn of different shrinkage rates such as polyester, nylon or the like; a bulked yarn such as an acrylic fiber yarn obtained by blending with shrunk cotton or conjugated cotton and heat-treating to provide with a bulkiness or a spun yarn of sheep wool, cotton or hemp. Among these, a false twist finished yarn is preferred since it is superior in stretch and shrink elasticity and is also inexpensive.

The tie yarn used in the present invention is welded itself through a heat treatment, but it may happen that the tie yarn welds to the face cloth and the back cloth before performing the heat treatment. When yarns of the same materials as that of the yarn at the welded portion of the tie yarn are used in the face cloth and/or back cloth, the adhesiveness between the tie yarn and the face cloth and/or back cloth increases. Such an improvement in adhesiveness between the tie yarn and the face cloth and/or back cloth is preferable in improving the seam strength and shape-retainability of the double-knitted fabric. Thus, it is preferable to suitably combine the tie yarn with the face cloth and back cloth in consideration of the adhesiveness of the both.

When using a tie yarn made of a polymer such as nylon or polyurethane, especially polyurethane, which are easily fused with other fibers, the seam strength and shape-retainability of the obtained double-knitted fabric can be improved, since the tie yarn and the face cloth and/or back cloth strongly adheres together even if the polymer used in the tie yarn and the polymer used in the fiber of the face cloth and/or back cloth are not the same.

The thickness of the tie yarn is not particularly limited. In general, it is preferable to adjust the thickness in accordance with the knitting fabric and the number of gauges of a knitting machine. In order to improve the cushioning property of the double-knitted fabric and make the knit durable against fatigue, preferably the number of tie yarns per unit area is made large. Further, it is preferable to adjust the thickness and number of the tie yarns in consideration of the knitting property and the influence on the surface of the double-knitted fabric.

If a filament of heat-bonding yarn is singly used as the tie yarn, it is preferable to use a twisted yarn of the filament in order to improve the adhesiveness of the filament itself. The use of such a twisted yarn as the tie yarn has the advantage that the obtained double-knitted fabric becomes more endurable against fatigue. The number of twists of such a twist yarn of filaments varies depending on the thickness of the filament and cannot be indiscriminately determined. In order to obtain a tie yarn having sufficient adhesiveness itself and to sufficiently prevent the double-knitted fabric from causing fatigue, it is preferable that the twist coefficient is not less than 4. Further, it is desirable to set the twist coefficient to not more than 15, preferably not more than 10, whereby the feeling of the double-knitted fabric is prevented from getting worse due to the tie yarn becoming too hard and the cost is kept low. The term "twist coefficient" as used herein is a coefficient to be multiplied by a square root of the yarn thickness (denier) and the unit is the number of twists per 1 m.

Methods for manufacturing the double-knitted fabric according to the present invention are not particularly limited. For instance, a method as described below can be employed.

Double-knitted fabrics are usually manufactured by circular knitting. Manufacturing is performed using a general circular knitting machine.

The circular knitting machine generally has numerous supply openings, so plural yarns such as a yarn for the face cloth, a yarn for the back cloth and a tie yarn are simultaneously supplied. At that time, if the tie yarn is supplied in such a manner that S twist (righthand twist) and Z twist (lefthand twist) are alternately knitted, the tie yarn does not collapse and a double-knitted fabric with a large thickness can be manufactured. Among circular knitting machines, a purl circular knitting machine is preferably used. Since the thickness of the double-knitted fabric is proportional to the moving width of the needle, it is desirable that the hook is adjusted as occasion demands.

The gray fabric of the double-knitted fabric is opened and is heat-set in a tenter dryer. At this time, by suitably shrinking the double-knitted fabric in the width direction or machine direction, the thickness can be maintained. The width direction can be adjusted by the tenter width and the machine direction can be adjusted by overfeed.

The temperature and time in the heat-setting varies depending on the kind of the polymer constituting the tie yarn and the like. Preferably the temperature at the time of heat-setting is adjusted so as to maintain the knitting form of the tie yarn and the crimping force of the crimp by the heat-setting in a constant range. If the crimping force is too large, the heat-setting will be too excessive, so the tie yarn becomes too hard. If the tie yarn is too hard, distortion is apt to remain in the tie yarn when repetitive load is applied to the double-knitted fabric, and fatigue of the double-knitted fabric tends to be large. Further, if the temperature at the time of heat-setting is too low and accordingly the heat-setting is insufficient, the hardness of the tie yarn is low and the cushioning property of the double-knitted fabric tends to be decreased. Thus, since the degree of hardness of the tie yarn varies depending on the polymer constituting the tie yarn, the thickness of the fiber and the composing number, it is preferable to perform the heat-setting after previously measuring the crimping force of the tie yarn and determining proper heat-setting conditions such as the temperature, amount of wind and feed speed of the respective chambers of the tenter.

The double-knitted fabric may be dyed after heat-setting. When dyeing after heat-setting, care should be taken so as not to produce wrinkles in the double-knitted fabric, since it is heat-treated again at the time of dyeing. In order to prevent generation of wrinkles in the double-knitted fabric, it is preferable to employ, for example, a star dyeing method wherein dyeing is performed by suspending. If the tie yarn is bright, it is sufficient to dye the face cloth and/or the back cloth, and the appearance will not be bad even if the tie yarn is not dyed.

The thus obtained double-knitted fabric according to the present invention comprises a face cloth and a back cloth which are joined together by means of a tie yarn, as described before. In the present invention, it is also possible to form a skin layer onto the face cloth. The skin layer formed on the face cloth is advantageous in that the double-knitted fabric can be more easily subjected to, in particular, molding using a mold, so manufacturing of uppers of shoes, seat cloths and the like are made easy to result in reduction of cost, and in that the cushioning property of the double-knitted fabric is further improved.

For instance, polyurethane elastomer layer and polyvinyl chloride layer are preferably used as the skin layer.

Examples of the polyurethane elastomer for forming the polyurethane elastomer layer are, for instance, polyurethanes obtained by reacting a polyol having a low melting point and having usually a number average molecular weight of about 500 to about 6,000 such as dihydroxy polyether, dihydroxy polyester, dihydroxy polycarbonate or dihydroxy polyesteramide with an organic diisocyanate having usually a molecular weight of not more than about 500 such as p,p'-diphenylmethane diisocyanate, tolylene diisocyanate, isophorone diisocyanate, 2,6-diisocyanate, hydrogenated diphenylmethane diisocyanate or xylylene diisocyanate in the presence of a chain extender having usually a molecular weight of not more than about 500 such as a glycol, an amino alcohol or a triol.

The polyol having a low melting point, organic diisocyanate and chain extender are used in a suitable combination. Among the above exemplified compounds, it is preferable, in terms of low cost, to employ polytetramethylene glycol, poly-$\epsilon$-caprolactone or polybutylene adipate as the polyol. In case that polyethylene glycol is used as the polyol, the resulting polyurethane presents an improved hydrophilic property, so the polyethylene glycol is suitably used when it is desired to obtain a double-knitted fabric required to have a hydrophilic property. Further, it is preferable, in terms of low cost, to employ p,p'-diphenylmethane diisocyanate as the organic diisocyanate. Still further, it is preferable, in terms of low cost, to employ p,p'-bishydroxyethoxy benzene and 1,4-butanediol as the chain extender.

As discussed before, the polyurethane elastomers preferably used in the present invention are those obtained from polyol, organic diisocyanate and chain extender, and in order to provide a proper hardness, it is desirable that the amount of the polyol component in the whole component is adjusted to be not less than 65% by weight, preferably not less than 70% by weight.

Examples of the polyvinyl chloride layer are layers formed from vinyl chloride based resins having usually a degree of polymerization of about 1,000 to about 3,000, e.g., polyvinyl chloride, and copolymers of vinyl chloride with vinyl acetate, vinylidene chloride, acrylonitrile, (meth) acrylic acid esters, vinyl ether, maleic acid, maleic acid ester or aliphatic vinyl compounds. When forming the polyvinyl chloride layer, it is preferable to incorporate into the vinyl chloride based resins a plasticizer, e.g., a phthalic acid ester such as dibutyl phthalate, diheptyl phthalate, di-n-octyl phthalate, diisooctyl phthalate or di-2-ethylhexyl phthalate and a phosphoric acid ester such as tri-2-ethylhexyl phosphate or triphenyl phosphate; and a stabilizer, e.g., an organotin compound such as dibutyl tin laurate, dibutyl tin dilaurate, dioctyl tin laurate, dioctyl tin dilaurate, dibutyl tin maleate, dibutyl tin dimaleate or dioctyl tin maleate and a lead compound such as lead stearate, dibasic lead stearate, dibasic lead phosphite or tribasic lead sulfate. The amount of the plasticizer is preferably not less than approximately 30 parts by weight per 100 parts by weight of the vinyl chloride based resin, in order to provide a flexibility to the double-knitted fabric so as to, for instance, enable easy molding using a mold, and in order to prevent the polyvinyl chloride layer in the form of a film from getting too hard to hinder the cushioning property of the double-knitted fabric from sufficiently raising. Further, in order to prevent the polyvinyl chloride layer in the form of a film from getting too soft to become sticky, the amount of the plasticizer is preferably not more than approximately 60 parts by weight per 100 parts by weight of the vinyl chloride based resin.

Methods for forming the skin layer on the face cloth are not particularly limited. Adoptable are, for instance, a method comprising laminating a previously formed film of polyurethane elatomer or polyvinyl chloride onto the face cloth, and a method comprising coating a polyurethane containing solvent on the face cloth with a knife or coating a melted vinyl chloride based resin in the form of a film.

The use of a wet coating method in the formation of the polyurethane elastomer layer as the skin layer is advantageous in that the formed polyurethane elastomer layer is provided with a permeability.

The skin layer thus obtained desirably has a thickness of not less than 5 $\mu$m, preferably not less than 10 $\mu$m to provide a sufficient wear-resistance.

The thickness of the double-knitted fabric according to the present invention is not particularly limited, and the thicknesses of the face cloth and the back cloth are suitably adjusted to have a proper thickness according to the purpose.

Since the double-knitted fabric according to the present invention has an excellent moldability, a high seam strength and an excellent cushioning property, it can be suitably used as various heat insulators, cushioning materials and moldings.

Moldings according to the present invention are those manufactured by molding the double-knitted fabrics having excellent properties mentioned above.

Examples of the moldings molded from the double-knitted fabrics are, for instance, bra cups, hats, protectors, interlinings, guesses, cases, shoes, bags, gloves, saddles for bicycles, bedspreads, and the like.

Methods for obtaining such moldings may be a method in which a mold of a desired shape is used and thermoforming is conducted by means of a heat-press molding machine or a vacuum molding machine. Conditions for molding the double-knitted fabric are not particularly limited, and it is preferable to suitably adjust them according to the kind of fiber used in the double-knitted fabric and the like.

The thus obtained moldings according to the present invention have a large seam strength and an excellent cushioning property owned by the double-knitted fabric. Moreover, such moldings can be inexpensively and easily manufactured.

An example of the cushioning materials obtained from the double-knitted fabric is a mouse pad. The mouse pad according to the present invention (hereinafter referred to as "mouse pad (I)") is comprised of a double-knitted fabric comprising a face cloth and a back cloth which are joined together by a tie yarn, wherein the tie yarn contains not less than 20% by weight of a heat-bonding yarn, the face cloth contains not less than 20% by weight of a heat-bonding yarn, the back cloth is subjected to a non-slip processing, and the face cloth and the back cloth are fused together at their respective end portions.

The mouse pad (I) according to the present invention is characterized in that a double-knitted fabric comprising the specific tie yarn mentioned above and the face cloth containing the specific yarn is used and the non-slip processing is applied to the back cloth.

The present inventors have made studies on knits with cushioning property, conditions for heat treatment thereof and non-slip treatment, and have found that especially the texture of the face cloth of the knit, yarns constituting it, and materials used in the non-slip treatment greatly influence the performances of the mouse pad such as response to slight movements of a mouse and easy-fixability of the pad to tables or the like. Thus, the inventors have accomplished the mouse pad (I) of the present invention by using a double-knitted fabric comprising the above-mentioned specific tie yarn and the face cloth containing the specific yarn and applying a non-slip treatment to the back cloth. Accordingly, the mouse pad (I) according to the present invention presents properties such that it can sensitively accommodate to even slight movements of the mouse (1 pixel) and can be fixed to tables or the like.

The term "mouse pad" as used herein indicates a desk pad for a remote controller (commonly called "mouse") for moving the cathode position on the display by the movement of a ball.

The double-knitted fabric used in the mouse pad (I) according to the present invention has face cloth and back cloth joined together by a tie yarn.

The face cloth contains not less than 20% by weight of a heat-bonding yarn.

Examples of the heat-bonding yarn may be heat-bonding yarns exemplified as the heat-bonding yarns used in the double-knitted fabrics according to the present invention.

As described above, in the mouse pad (I) according to the present invention, the face cloth of the double-knitted fabric contains not less than 20% by weight of the heat-bonding yarn. If the content of heat-bonding yarn is less than 20% by weight, running of the face cloth is hard to stop, a proper surface hardness is hardly provided for improving the gliding of the mouse, and a fiber of the face cloth is hardly prevented from falling off. Preferably, the content of the heat-bonding yarn is from 30 to 100% by weight, especially 50 to 100% by weight, in order to further prevent the face cloth from fraying and to improve the gliding of the mouse.

The face cloth is not particularly limited as long as it contains not less than 20% by weight of a heat-bonding yarn.

The face cloth may be composed of the heat-bonding yarn only, but yarns of various synthetic and natural fibers as listed above as the yarns used in the face cloth of the double-knitted fabric according to the present invention may also be suitably used with the heat-bonding yarn. Further, the face cloth may be of first-dyed yarn and it may also contain a jacquard knitted design.

In the mouse pad (I) according to the present invention, preferably the face cloth is made of filaments since the falling off of fiber through friction with the mouse is decreased.

There is no particular limitation in the thickness of the yarn which constitutes the face cloth, but in improving a balance between the tie yarn and the face cloth, it is desirable that the thickness of the yarn of the face cloth is not less than 150 deniers, preferably not less than 170 deniers, and in improving the smoothness of the face cloth, it is desirable that the thickness of the yarn of the face cloth is not more than 350 deniers, preferably not more than 200 deniers. The wale and course of knitting are almost fixedly determined by the thickness of the yarn of the face cloth. Further, the knitting fabric is desired to have a smooth and simply structured surface.

The thickness of the face cloth is not particularly limited, and it may be suitably adjusted taking account of the thickness of the mouse pad (I) finally obtained.

The type of yarn used in the back cloth of the mouse pad (I) according to the present invention is not particularly limited, and yarns made from various synthetic and natural fibers as listed for the yarns to be used in the face cloth of the double-knitted fabric according to the present invention may be suitably used. Such back cloth may be of first-dyed yarn or may contain jacquard knitted designs.

The back cloth may contain, if necessary, a heat-bonding yarn as used in the face cloth or the tie yarn described later.

The thickness of the yarn constituting the back cloth is not particularly limited, and may be properly selected in accordance with the knitting fabric and knitting machine.

The thickness of the back cloth is not particularly limited, and may be suitably adjusted taking account of the thickness of the mouse pad (I) finally obtained.

The tie yarn used in the mouse pad (I) according to the present invention contains not less than 20% by weight of a heat-bonding yarn.

Examples of the heat-bonding yarn used in the tie yarn are, for instance, those exemplified for the heat-bonding yarn used in the tie yarn of the double-knitted fabric according to the present invention.

Among these heat-bonding yarns, preferred is a core-sheath type heat-bonding yarn which is preferably used in the double-knitted fabric according to the present invention.

As mentioned before, the tie yarn used in the mouse pad (I) according to the present invention contains not less than 20% by weight of the heat-bonding yarn. It is desirable that the content of the heat-bonding yarn is from 30 to 100% by weight, preferably 50 to 100% by weight, like in the case of the double-knitted fabric according to the present invention.

Though the tie yarn may be composed of the heat-bonding yarn only, yarns as listed for the tie yarns in the double-knitted fabric according to the present invention may also be used in the tie yarn.

In the mouse pad (I) of the present invention, the combination of the tie yarn and the surface and back cloths, and the thickness, number or shape of the tie yarn may be those described for the double-knitted fabric according to the present invention.

Also, manufacturing and dyeing of the double-knitted fabric used in the mouse pad (I) may be performed in the same manner as the double-knitted fabric according to the present invention.

The thickness of the double-knitted fabric is not particularly limited, and it may be suitably adjusted taking account of the thickness of the mouse pad (I) to be finally obtained.

The mouse pad (I) according to the present invention is one obtained by subjecting the back cloth of the double-knitted fabric to a non-slip treatment.

The non-slip treatment of the back cloth of the double-knitted fabric can be easily performed, for instance, by laminating a non-slipping material such as a film or non-woven fabric of polyurethane, polyvinyl chloride rubber, ethylene-vinyl acetate copolymer or the like onto the back cloth.

Examples of the materials constituting the non-slip material such as the film or non-woven fabric are, for instance, polyurethanes obtained from the polyol, organic diisocyanate and chain extender as exemplified for use in obtaining the polyurethane elastomers to be formed on the face cloth of the double-knitted fabric according to the present invention; vinyl chloride based resins such as polyvinyl chloride as exemplified for use in obtaining the polyvinyl chloride layer formed on the face cloth of the double-knitted fabric according to the present invention; rubbers, e.g., natural rubber and synthetic rubbers such as styrene-butadiene rubber, nitrile rubber, chloroprene rubber, butadiene rubber, isoprene rubber and butyl rubber; and hot melt type ethylene-vinyl acetate copolymers, e.g., an ethylene-vinyl acetate copolymer having a vinyl acetate content of about 15 to about 35% by weight, a hydrolyzed ethylene-vinyl acetate copolymer such as ethylene-vinyl copolymer or ethylene-vinyl alcohol-vinyl acetate terpolymer, and a modified ethylene-vinyl acetate copolymer such as a graft polymer such as ethylene-vinyl acetate-vinyl chloride terpolymer or carboxyl group-containing ethylene-vinyl acetate copolymer. Among these, it is preferable to use a soft polyurethane, since it has a large friction coefficient. An example of the polyurethane non-woven fabric is Expansione (manufactured by Kanebo, Ltd.). In case of applying such a polyurethane non-woven fabric to the back cloth, it is preferable to use an ultrasonic sewing machine, a high frequency welder or a heat welder which enables simultaneous cutting and molding, whereby the face cloth is prevented from fraying.

It is preferable that the non-slipping material provided on the back cloth is not partially printed in order to avoid unevenness formed on the surface. It is also preferable that the non-slipping material itself is superior in flatness. Thus, it is more preferable to use a film than an non-woven fabric because of having a greater friction coefficient.

In case of using a film as the non-slipping material, the thickness thereof is not particularly limited, and may be suitably adjusted. In order to present a sufficient mechanical strength and to maintain the flatness of the film, it is desirable that the film thickness is not less than 20 $\mu$m, preferably not less than 100 $\mu$m. In case of using a non-woven fabric as the non-slipping material, the weight of the fabric per unit area is not limited and may be suitably adjusted, but from the viewpoint of the mechanical strength of the non-woven fabric, preferably the weight per unit area is at least 15 g/m$^2$.

Methods for laminating the non-slipping material to the back cloth are not particularly limited. For instance, adoptable are a method in which a soft adhesive such as an ethylene-vinyl acetate copolymer adhesive or a polyurethane adhesive is coated or sprayed onto the back cloth and the non-slipping material is laminated thereon, and a method in which a film is extruded from a T-die and simultaneously laminated.

After applying the non-slip processing to the back cloth of the double-knitted fabric, the face cloth and back cloth are fused together at their ends to obtain the mouse pad (I) according to the present invention.

Methods for welding the face cloth and the back cloth at their ends are not particularly limited, and methods can be employed in which an ultrasonic sewing machine, a high frequency welder or a heat welder or the like is used.

The thickness of the mouse pad (I) according to the present invention is not particularly limited, and it is preferably adjusted taking account of the feeling of use.

The present invention also provides a mouse pad, in addition to the mouse pad (I), which is made of a three-layer structured double tricot wherein a face cloth and a back cloth are joined together by a tie yarn, the face cloth contains not less than 20% by weight of a heat-bonding yarn, the back cloth is non-slip treated, and the face cloth and back cloth are welded at their ends (hereinafter referred to as "mouse pad (II)").

The mouse pad (II) according to the present invention is characterized by the use of a double tricot which has a face cloth comprising the above-mentioned specific yarn and a back cloth is subjected to a non-slip processing.

The present inventors have made studies on tricots with cushioning property, and heat treating conditions and non-slip processing therefor and have found that especially the texture of the face cloth of the tricot, yarns constituting it, and materials used for the non-slip treatment greatly influence the performances of the mouse pad such as response to slight movements of a mouse and easy-fixability of the pad to tables or the like. Thus, the inventors have accomplished the mouse pad (II) of the present invention by using a double tricot having a face cloth comprising the specific tie yarn and having a back cloth subjected to a non-slip processing. Thus, the mouse pad (II) according to the present invention presents properties such that it can sensitively accomodate even to slight movements of the mouse and can be firmly fixed to tables or the like.

The three-layer structured double tricot used in the mouse pad (II) according to the present invention has face cloth and back cloth joined together by a tie yarn.

The kind and thickness of the yarns used in the face cloth and the back cloth and the thicknesses of the face cloth and the back cloth are not particularly limited, and may be equal to those for the mouse pad (I) according to the present invention.

In the mouse pad (II) according to the present invention, too, it is preferable that the face cloth is made of a filament, since only a small amount of fiber falls off through friction with the mouse.

The kind and thickness of the tie yarn used in the mouse pad (II) according to the present invention are not particularly limited, and may be equal to those of the tie yarn used in the mouse pad (I) according to the present invention. Since the mouse pad (II) is of double tricot, a hard yarn such as nylon monofilament can also be used as the tie yarn.

The method for manufacturing the three-layer structured double tricot is not particularly limited. The double tricot can be manufactured, for instance, by warp knitting with a warp knitting machine which has been generally used for obtaining tricots. The double tricot can be obtained in the same manner as the double-knitted fabric in the mouse pad (I) except for generally using a warp knitting machine as a knitting machine instead of a circular knitting machine.

The thickness of the double tricot is not particularly limited, and it may be suitably adjusted taking account of the thickness of the mouse pad (II) to be finally obtained.

In mouse pad (II) according to the present invention, a non-slip processing is further applied to the back cloth of the three-layered double tricot. The non-slip processing for the back cloth of the double tricot can be performed in the same manner as in the mouse pad (I).

The mouse pad (II) can be manufactured by, after subjecting the back cloth of the double tricot to the non-slip processing, welding the face cloth and back cloth of the double tricot at their ends in the same manner as in the mouse pad (I).

The thickness of the mouse pad (II) according to the present invention is not particularly limited, and may be similar to that of the mouse pad (I).

The mouse pads (I) and (II) according to the present invention respond sensitively even to slight movements of the mouse, and since the mouse pads themselves are fixed to a table or the like for better use, they are suitable for use with a mouse for computers or the like.

Next, the double-knitted fabric, moldings made thereof and mouse pads according to the present invention will be explained in more details based on Examples, but the present invention is not limited to only these Examples.

EXAMPLE 1

A double-knitted fabric having a thickness of 2 mm was manufactured by using a polyester false twist finished yarn (SD150D/48F, manufactured by Kanebo, Ltd.) as a ground yarn for a face cloth, an alternately twisted union yarn of a core-sheath type heat-bonding yarn (Bellcouple, type LCO150D/48F, manufactured by Kanebo, Ltd., heat-sealing temperature: not less than 180° C., number of twists: 100 times/m) and the afore-mentioned polyester false twist finished yarn as a ground yarn for a back cloth, and a core-sheath type heat-bonding yarn (Bellcouple, type LCO250D/16F, manufactured by Kanebo, Ltd., heat-bonding temperature: not less than 180° C., twist coefficient: 100 times/m) as a tie yarn, and by knitting the yarns using a purl circular knitting machine of 20 gauges and 32 openings, opening the obtained tubular knitted fabric, shrinking 18% in the width direction in a tenter dryer and welding for 2 minutes at an ambient temperature of 150° C.

The core-sheath type heat-bonding yarns used as the ground yarn for the back cloth and as the tie yarn have a principal heat-bonding temperature of 180° C. and essentially start heat-bonding when the temperature reaches 110° C. or more. Thus, in order to partially weld these core-sheath type heat-bonding yarns, the ambient temperature was set at 150° C.

The cushioning property and seam fatigue strength were measured by using the obtained double-knitted fabric.

The cushioning property was evaluated by measuring a fatigue ratio according to the "repeated compression test" provided in JIS K 6401. Since a single double-knitted fabric did not present a sufficient thickness as a sample for the compression test, the double-knitted fabric was stacked until the thickness was approximately 6 cm to obtain a measuring sample. The results indicated that the fatigue ratio was 7.8%. Thus, it was found that the double-knitted fabric had an excellent cushioning property.

The seam fatigue strength was measured by the following method.

Two sheets of the double-knitted fabric were stacked and sewed with an industrial sewing machine of 5 mm pitch by using a machine sewing thread of polyester No. 8 and a ballpoint needle No. 21. Then, the double-knitted fabric having a width of 10 cm was held at its both ends by a clamp with a width of 5 cm at a clamping interval of 12 cm and was applied with a load of 3 kg, and underwent repetitive testing 2,500 times with a stroke of 15 cm and stroke speed of 30 reciprocating movements/minute. Thereafter, the double-knitted fabric was removed and the length of the hole created by the seam (seam hole) was measured at 0.1 mm unit while applying a load of 0.5 kg. The results indicated that the seam hole length was 1.3 mm, so it was found that the double-knitted fabric had a sufficient seam strength to use in seats of automobiles.

EXAMPLE 2

The double-knitted fabric obtained in Example 1 was pressed from the back cloth side by a heat press draw molding machine under conditions of a preheating temperature set to 200° C., a cast temperature set to 200° C. and a die temperature set to room temperature into a hemispherical shape with a diameter of 12 cm. After cooling, the molding maintained its hemispheric shape, so it could be smoothly taken out of the mold.

A molding in a bra cup form was obtained in the same manner as above, and was cut and sewed. The results indicated that the fabric strength was large and fraying peculiar to circular knitted fabric was not found at all.

EXAMPLE 3

A double-knitted fabric having a thickness of 1.5 mm was manufactured in the same manner as in Example 1 except that a double yarn of a polyester false twist finished yarn (SD150D/48F, manufactured by Kanebo, Ltd.) and a core-sheath type heat-bonding yarn (Bellcouple, type LCO75D/48F, manufactured by Kanebo, Ltd., number of twists: 100 times/m) was used as the tie yarn.

The cushioning property and seam fatigue strength were measured in the same manner as in Example 1 by using the obtained double-knitted fabric. As for the cushioning property, the fatigue ratio was 5.5%, thus it was found that the double-knitted fabric was superior in cushioning property. As for the seam fatigue strength, the seam hole length was 1.5 mm, so it was found that the double-knitted fabric had a sufficient seam strength to use in seats of automobiles.

EXAMPLE 4

A double-knitted fabric having a thickness of 2 mm was manufactured in the same manner as in Example 1 except that a double yarn of a polyester false twist finished yarn (SD150D/48F, manufactured by Kanebo, Ltd.) and a core-sheath type heat-bonding yarn (Bellcouple, type LCO75D/48F, manufactured by Kanebo, Ltd., number of twists 100 times/m) was used as the ground yarn for the back cloth.

The cushioning property and seam fatigue strength of the obtained double-knitted fabric were measured in the same manner as in Example 1. As for the cushioning property, the fatigue ratio was 7.8%, and it was found that the double-knitted fabric was superior in cushioning property. As for the seam fatigue strength, from the result that the seam hole length was 1.8 mm, it was found that the double-knitted fabric had a sufficient seam strength to use in seats of automobiles.

EXAMPLE 5

A double-knitted fabric having a thickness of 2 mm was manufactured in the same manner as in Example 1 except that the ground yarn for the face cloth was changed to a first-dyed high bulked yarn wherein 30% by weight of a shrunk cotton of an acrylic spun yarn (DMM1/60, manufactured by Kanebo, Ltd.) was blended.

The face cloth of the obtained double-knitted fabric was raised by a raising machine and the length of the raising was cut to 3 mm by shearing.

The cushioning property and seam fatigue strength of the raised double-knitted fabric were measured in the same manner as in Example 1. As for the cushioning property, the fatigue ratio was 7.6%, and it was found that the double-knitted fabric was superior in cushioning property. As for the seam fatigue strength, since the seam hole length was 1.5 mm, it was found that the double-knitted fabric had a sufficient seam strength to use in seats of automobiles.

EXAMPLE 6

A double-knitted fabric having a thickness of 3.5 mm was manufactured by using a polyester false twist finished yarn (SD150D/48F, manufactured by Kanebo, Ltd.) as a ground yarn for a face cloth, an alternately twisted union yarn of a core-sheath type heat-bonding yarn (Bellcouple, type LCO150D/48F, manufactured by Kanebo, Ltd., melting point: 170° C., number of twists: 100 times/m) and the afore-mentioned polyester false twist finished yarn as a ground yarn for a back cloth, and a core-sheath type heat-bonding yarn (Bellcouple, type HCC250D/16F, manufactured by Kanebo, Ltd., core: polyester, melting point of core: 255° C., sheath: nylon 6, melting point of sheath: 214° C., Young's modulus of sheath: 190 kg/mm², number of twists: 100 times/m), as a tie yarn, and by knitting the yarns using a purl circular knitting machine of 20 gauges and 32 openings, opening the obtained tubular knitted fabric, shrinking 18% in the width direction in a tenter dryer and welding for 2 minutes at an atmospheric temperature of 210° C.

The cushioning property and seam fatigue strength were measured in the same manner as in Example 1 by using the obtained double-knitted fabric. As for the cushioning property, only a small amount of fatigue was detected even if repetitive load was applied, and it was found that the double-knitted fabric was superior in cushioning property. As for the seam fatigue strength, since the seam hole length was 1.3 mm it was found that the double-knitted fabric had a sufficient seam strength to use in seats of automobiles.

EXAMPLE 7

The double-knitted fabric obtained in Example 6 was pressed from the back cloth side by using a heat press draw molding machine under conditions of a preheating temperature set to 190° C., a cast temperature set to 190° C. and a die temperature set to room temperature to mold the double-knitted fabric into a hemispherical shape with a diameter of 12 cm. After cooling, the molding maintained its hemispheric shape, so it could be smoothly taken out of the mold. The thickness of the double-knitted fabric after molding was 3.1 mm.

Further, a molding in a bra cup form was obtained in the same manner as above, cut and sewed. The fabric strength was large, and fraying peculiar to circular knitted fabrics did not occur at all.

EXAMPLE 8

A double-knitted fabric having a thickness of 3.7 mm was manufactured in the same manner as in Example 6 except that the tie yarn was changed to a double yarn of a polyester false twist finished yarn (SD150D/48F, manufactured by Kanebo, Ltd) and a core-sheath type heat-bonding yarn (Bellcouple, type LCO75D/48F, manufactured by Kanebo, Ltd., melting point: 200° C., Young's modulus of sheath: 950 kg/mm², number of twists: 100 times/m).

The cushioning property and seam fatigue strength were measured in the same manner as in Example 1 by using the obtained double-knitted fabric. As for the cushioning property, only a small amount of fatigue was observed even if repetitive load was applied, and it was found that the double-knitted fabric was superior in cushioning property. As for the seam fatigue strength, from the result that the seam hole length was 1.6 mm, it was found that the double-knitted fabric had a sufficient seam strength to use in seats of automobiles.

EXAMPLE 9

A double-knitted fabric having a thickness of 3.5 mm was manufactured in the same manner as in Example 6 except that the ground yarn for the back cloth was changed to a double yarn of a polyester false twist finished yarn (SD150D/48F, manufactured by Kanebo, Ltd.) and a core-sheath type heat-bonding yarn (Bellcouple, type LCO75D/48F, manufactured by Kanebo, Ltd., melting point: 130° C., number of twists: 100 times/m).

The cushioning property and seam fatigue strength were measured in the same manner as in Example 1 by using the obtained double-knitted fabric. As for the cushioning property, only a small amount of fatigue was observed even if repetitive load was applied, and it was found that the double-knitted fabric was superior in cushioning property. As for the seam fatigue strength, from the result that the seam hole length was 1.7 mm, it was found that the double-knitted fabric had a sufficient seam strength to use in seats of automobiles.

EXAMPLE 10

A double-knitted fabric having a thickness of 3.5 mm was manufactured in the same manner as in Example 6 except that the ground yarn for the face cloth was changed to a first-dyed high bulked yarn which was blended with 30% by weight of a shrunk cotton of an acrylic spun yarn (DMM1/60, manufactured by Kanebo, Ltd.).

Next, the face cloth of the obtained double-knitted fabric was raised by a raising machine and the length of the raising was cut to 3 mm by shearing.

The cushioning property and seam fatigue strength were measured in the same manner as in Example 1 by using the raised double-knitted fabric. As for the cushioning property, only a small amount of fatigue was observed even if repetitive load was applied, and it was found that the double-knitted fabric was superior in cushioning property. As for the seam fatigue strength, from the result that the seam hole length was 1.3 mm, it was found that the double-knitted fabric had a sufficient seam strength to use in seats of automobiles.

EXAMPLE 11

A double-knitted fabric having a thickness of 3.6 mm was manufactured in the same manner as in Example 6 except that the tie yarn was changed to a double yarn of a polyester false twist finished yarn (SD75D/36F, manufactured by Kanebo, Ltd.) and a core-sheath type heat-bonding yarn (75D/48F, core: polyethylene terephthalate, melting point of core: 255° C., sheath: syndiotactic polypropylene, Young's modulus of sheath: 100 kg/mm², pentad rate of sheath (content of a unit composed of 5 successive assymetric carbon atoms having a syndiotactic structure obtained by nuclear magnetic resonance spectrum analysis): 85%, melting point of sheath: 135° C., number of twists: 100 times/m) and the welding was carried out for 1 minute at an atmospheric temperature of 150° C.

The cushioning property and seam fatigue strength were measured in the same manner as in Example 1 by using the obtained double-knitted fabric. As for the cushioning property, the fatigue ratio was 6% even after applying the repetitive load 80,000 times, and fatigue was hardly observed by the naked eye, so it was found that the double-knitted fabric was superior in cushioning property. As for the seam fatigue strength, from the result that the seam hole length was 1.7 mm, it was found that the double-knitted fabric had a sufficient seam strength to use in seats of automobiles.

EXAMPLE 12

A polyvinyl chloride layer (skin layer) having a thickness of 0.5 mm was formed on the face cloth of the double-knitted fabric obtained in Example 6 by mixing 100 parts by weight of polyvinyl chloride (degree of polymerization: 1,300), 80 parts by weight of dibutyl phthalate as a plasticizer, 2 parts by weight of dibutyl tin laurate as a stabilizer, and 1 part by weight of barium stearate as a stabilizer at a temperature of 180° C. with a Banburry mixer, and extruding the mixture in the form of a film from a T-die onto the surface. A pattern was then formed in the surface of the skin layer by an emboss roller, and was then cooled for solidification.

Using the double-knitted fabric with a skin layer formed thereon, the cushioning property and seam fatigue strength were measured in the same manner as in Example 1. As for the cushioning property, no fatigue was observed at all even if repetitive load was applied, and it was found that the double-knitted fabric was superior in cushioning property. As for the seam fatigue strength, from the result that the seam hole length was 1.0 mm, it was found that the double-knitted fabric had a sufficient seam strength to use in seats of automobiles.

EXAMPLE 13

On the face cloth of the double-knitted fabric obtained in Example 6 was formed a permeable polyurethane elastomer layer (skin layer) having a thickness of 1 mm by coating a dimethylformamide solution containing 15% by weight of a polyurethane obtained from butanediol, hexamethylene diisocyanate and adipic acid, dipping in a 10% aqueous solution of dimethylformamide, then washing with water to coagulate and drying.

Using the double-knitted fabric with the skin layer formed thereon, the cushioning property and seam fatigue strength were measured in the same manner as in Example 1. As for the cushioning property, no fatigue was observed at all even if repetitive load was applied, and it was found that the double-knitted fabric was superior in cushioning property. As for the seam fatigue strength, from the result that the seam hole length was 1.1 mm, it was found that the double-knitted fabric had a sufficient seam strength to use in seats of automobiles.

EXAMPLE 14

A double-knitted fabric having a thickness of 3.5 mm was manufactured by using a polyester false twist finished yarn (SD150D/48F, manufactured by Kanebo, Ltd.) as a ground yarn for a back cloth, an alternately twisted union yarn of a core-sheath type heat-bonding yarn (Bellcouple, type LCO150D/48F, manufactured by Kanebo, Ltd., filament, melting point: 170° C., number of twists: 100 times/m) and the afore-mentioned polyester false twist finished yarn as a ground yarn for a face cloth, and a core-sheath type heat-bonding yarn (Bellcouple, type HCC250D/16F, manufactured by Kanebo, Ltd., core: polyester, melting point of core: 255° C., sheath: nylon 6, melting point of sheath: 214° C., Young's modulus of sheath: 190 kg/mm², number of twists: 100 times/m) as a tie yarn, and by knitting the yarns using a purl circular knitting machine of 28 gauges and 32 openings, opening the resulting tubular knitted fabric, shrinking it 18% in the width direction in a tenter dryer and welding for 2 minutes at an ambient temperature of 210° C.

The back cloth of the obtained double-knitted fabric was subjected to non-slip processing by adhering a polyurethane melt blow non-woven fabric (Espansione, UHO30, manufactured by Kanebo, Ltd., weight of fabric per unit area: 30 g/m²) to the back cloth with a reactive polyurethane adhesive, and the face cloth and the back cloth were welded at their ends by means of an ultrasonic sewing machine, followed by cutting into a desired size to give a mouse pad.

An abrasion test was made using the obtained mouse pad. The abrasion test was made by measuring the decreasing amount of weight (mg) after executing a friction test 500 times in accordance with with JIS L 1018 C method (taper method). The results indicated that the decreasing amount of weight was as small as 28 mg, and it was found that the mouse pad was superior in abrasion resistance since the face cloth was made of heat-bonding yarn filaments, a heat-bonding yarn was employed as the tie yarn, and the face cloth and the back cloth were welded to each other.

The same abrasion test was executed for a reference mouse pad wherein the same yarn was used as the ground yarns for the face cloth and the back cloth. The decreasing amount of weight was 97 mg.

In order to check the non-slip effect of the mouse pad, the mouse pad was placed onto a glass plate, and the glass plate was gradually inclined to measure an inclination angle of the glass plate at which the mouse pad slipped down therefrom. The results indicated that the inclination angle of the glass plate with respect to horizontal plane was as large as 78°, and it was found that the mouse pad had a superior non-slip effect. The non-slip effect was similarly checked for a reference mouse pad wherein the knit was not laminated with the non-woven fabric (non-slip processing was not applied to the back cloth). The inclination angle of the glass plate with reference to horizontal plane was as quite small as 17°.

Repetitive load was applied to the obtained mouse pad, but fatigue hardly occurred. Further, in a practical test using a mouse, the sliding of the mouse was favorable, and no unevenness in thickness of the non-woven fabric was felt.

EXAMPLE 15

A mouse pad was manufactured in the same manner as in Example 14 except that the non-slip processing was made by using a polyurethane film having a thickness of 30 μm of instead of the polyurethane melt blow non-woven fabric. Using the obtained mouse pad, the non-slip effect was checked in the same manner as in Example 14. The inclination angle of the glass plate with respect to the horizontal plane was as large as 85°, and it was found that the mouse pad had an excellent non-slip effect.

Repetitive load was applied to the obtained mouse pad, but fatigue hardly occurred. Further, in a practical test using a mouse, the sliding of the mouse was favorable, and no unevenness in thickness of the film was felt as was the case of the non-woven fabric.

EXAMPLES 16 TO 18 AND COMPARATIVE EXAMPLE 1

A mouse pad was manufactured in the same manner as in Example 14 except that the content of the heat-bonding yarn in the ground yarn of the face cloth was changed as shown in Table 1.

The abrasion test of the obtained mouse pads was conducted in the same manner as in Example 14. The results are shown in Table 1. The thickness of the double-knitted fabric in the mouse pad shown in Table 1 is that for the mouse pad manufactured by changing the content of the heat-bonding yarn in the tie yarn as shown in Table 1.

TABLE 1

| Ex. No. | Content of heat-bonding yarn (% by weight) | Decreasing amount of weight (mg) | Thickness of double-knitted fabric (mm) |
| --- | --- | --- | --- |
| 16 | 20 | 49 | 3.1 |
| 17 | 30 | 33 | 3.3 |
| 18 | 100 | 19 | 3.8 |
| Com. Ex. 1 | 10 | 88 | 2.1 |

From the results as shown in Table 1, it is found that the more the heat-bonding yarn was contained in the ground yarn of the face cloth, the more the abrasion resistance of the mouse pad is improved.

EXAMPLE 19

A mouse pad was manufactured in the same manner as in Example 14 except that the ground yarn of the face cloth was changed to a spun yarn of a blend of 20% by weight of a heat-bonding short fiber (Bellcombi, manufactured by Kanebo, Ltd., 2 deniers, 51 mm) and 80% by weight of a regular polyester SD (1.4 deniers, 51 mm).

Using the obtained mouse pad, the abrasion test was executed in the same manner as in Example 14. The decreasing amount of weight was 64 mg.

EXAMPLE 20

A three-layer structured double tricot having a thickness of 5 mm was manufactured by using a polyester false twist finished yarn (SD75D/24F, manufactured by Kanebo, Ltd.) as a ground yarn for a back cloth, an alternately twisted union yarn of a core-sheath type heat-bonding yarn (Bellcouple, type LCO75D/24F, manufactured by Kanebo, Ltd., melting point: 170° C., number of twists: 100 times/m) and the afore-mentioned polyester false twist finished yarn as a ground yarn for a face cloth, and a core-sheath type heat-bonding yarn (Bellcouple, type HCC150D/24F, manufactured by Kanebo, Ltd., core: polyester, melting point of core: 255° C., sheath: nylon 6, melting point of sheath: 214° C., Young's modulus of sheath: 190 kg/mm$^2$, number of twists: 100 times/m) as a tie yarn, wherein the yarns were knitted by a double tricot knitting machine of 40 gauges and the atmospheric temperature was 230° C.

A mouse pad was manufactured by using the obtained double tricot in the same manner as in Example 14.

The abrasion test of the obtained mouse pad was conducted in the same manner Example 14. The decreasing amount of weight was as small as 24 mg.

INDUSTRIAL APPLICABILITY

The double-knitted fabric according to the present invention has an excellent moldability, a high seam strength and an excellent cushioning property and is inexpensive and, therefore, it can be suitably used in various heat insulators, cushioning material and moldings.

Since the moldings according to the present invention are those obtained by molding such a double-knitted fabric, they also have excellent properties as mentioned above.

Further, the mouse pad according to the present invention can accomodate even to slight movements of a mouse and is superior in that the pad itself is fixed to a table or the like and, therefore, it is suitable for use with mouses in connection with computers or the like.

We claim:

1. A double-knitted fabric comprising a face cloth and a back cloth which are joined together by a tie yarn, wherein said tie yarn contains not less than 20% by weight of a heat-bonding yarn, said heat-bonding yarn contained in said tie yarn is a core-sheath type heat-bonding yarn and the Young's modulus of a polymer used in said sheath is not more than 600 kg/mm$^2$, and said back cloth contains not less than 20% by weight of a heat-bonding yarn.

2. The double-knitted fabric according to claim 1, wherein the melting point of said heat-bonding yarn used in said back cloth is lower than the melting point of said heat-bonding yarn used in said tie yarn by at least 20° C.

3. The double-knitted fabric according to claim 1, wherein said face cloth is raised.

4. The double-knitted fabric according to claim 1, wherein a layer of a polyurethane elastomer or a layer of a polyvinyl chloride is formed as a skin layer on said face cloth.

5. A molding obtained by molding said double-knitted fabric of claim 1.

6. A mouse pad comprising a double-knitted fabric comprising a face cloth and a back cloth which are joined together by a tie yarn, wherein said tie yarn contains not less than 20% by weight of a heat-bonding yarn, said face cloth contains not less than 20% by weight of a heat-bonding yarn, said back cloth is subjected to a non-slip processing, and said face cloth and said back cloth are welded at their end portions.

7. The mouse pad according to claim 6, wherein said face cloth is made of a filament.

8. The mouse pad according to claim 6, wherein said heat-bonding yarn contained in said tie yarn is a core-sheath type heat-bonding yarn, and the Young's modulus of a polymer used in said sheath is not more than 600 kg/mm$^2$.

9. The mouse pad according to claim 6, wherein said non-slip processing is carried out by laminating a non-slipping material onto said back cloth.

10. A mouse pad comprising a three-layer structured double tricot comprising a face cloth and a back cloth which are joined together by a tie yarn, wherein said face cloth contains not less than 20% by weight of a heat-bonding yarn, said back cloth is subjected to a non-slip processing, and said face cloth and said back cloth are welded at their end portions.

11. The mouse pad according to claim 10, wherein said face cloth is made of a filament.

12. The mouse pad according to claim 10, wherein said tie yarn contains not less than 20% by weight of a core-sheath type heat-bonding yarn, and the Young's modulus of a polymer used in said sheath is not more than 600 kg/mm$^2$.

13. The mouse pad according to claim 10, wherein said non-slip processing is carried out by laminating a non-slipping material onto said back cloth.

14. A double-knitted fabric comprising a face cloth and a back cloth which are joined together by a tie yarn, and a skin layer of a polyurethane elastomer or a polyvinyl chloride disposed on said face cloth, wherein said tie yarn contains not less than 20% by weight of a heat-bonding yarn and said back cloth contains not less than 20% by weight of a heat-bonding yarn.

* * * * *